INVENTOR
JOHN CRAWFORD MARTIN
BY- Fetherstonhaugh + Co
ATTORNEYS

Dec. 3, 1963   J. C. MARTIN   3,112,949
VEHICLE UNLOADING OR LOADING DEVICES
Original Filed Dec. 29, 1958   4 Sheets-Sheet 2
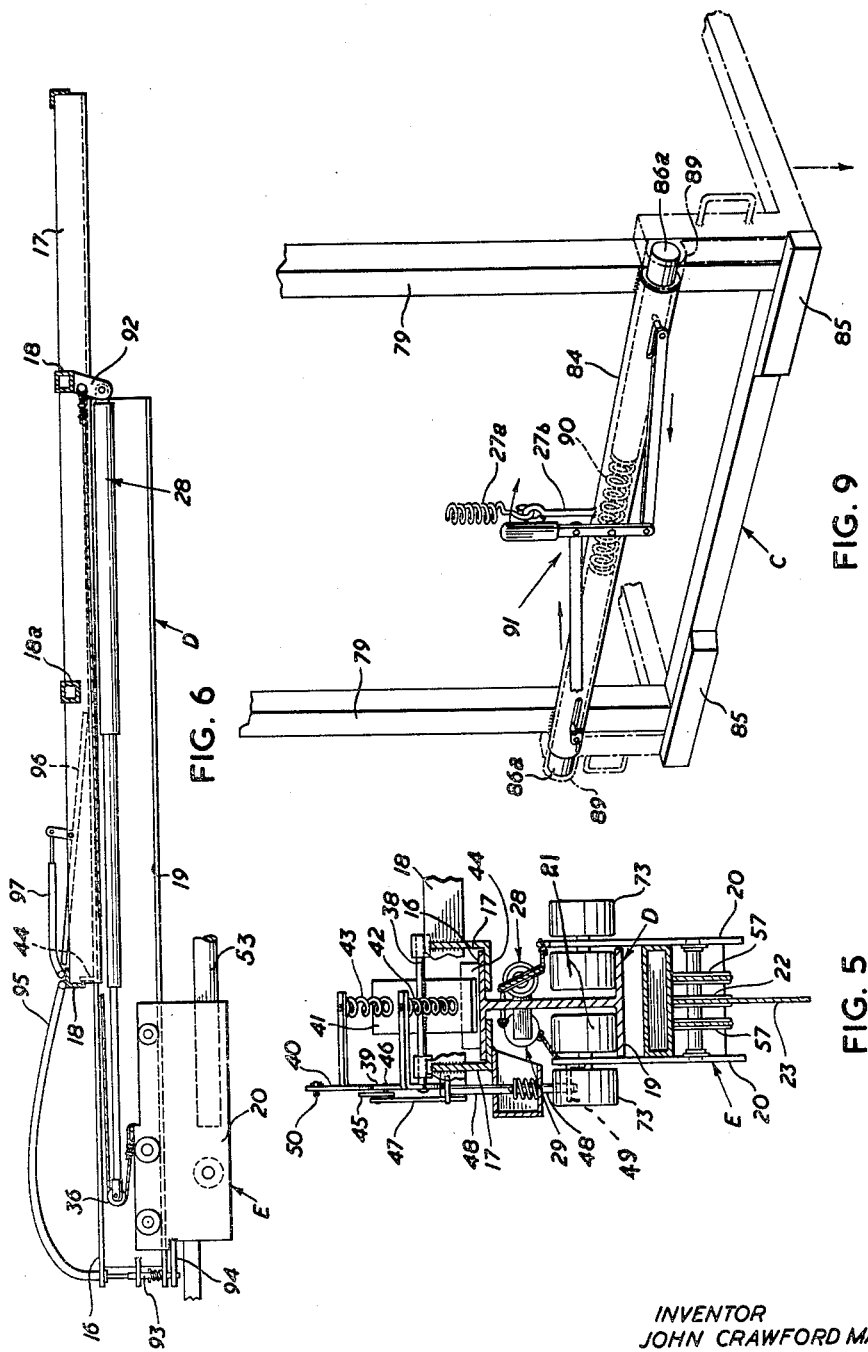
INVENTOR
JOHN CRAWFORD MARTIN
BY~ Fetherstonhaugh &o
ATTORNEYS

INVENTOR
JOHN CRAWFORD MARTIN

BY~ Featherstonhaugh & Co
ATTORNEYS

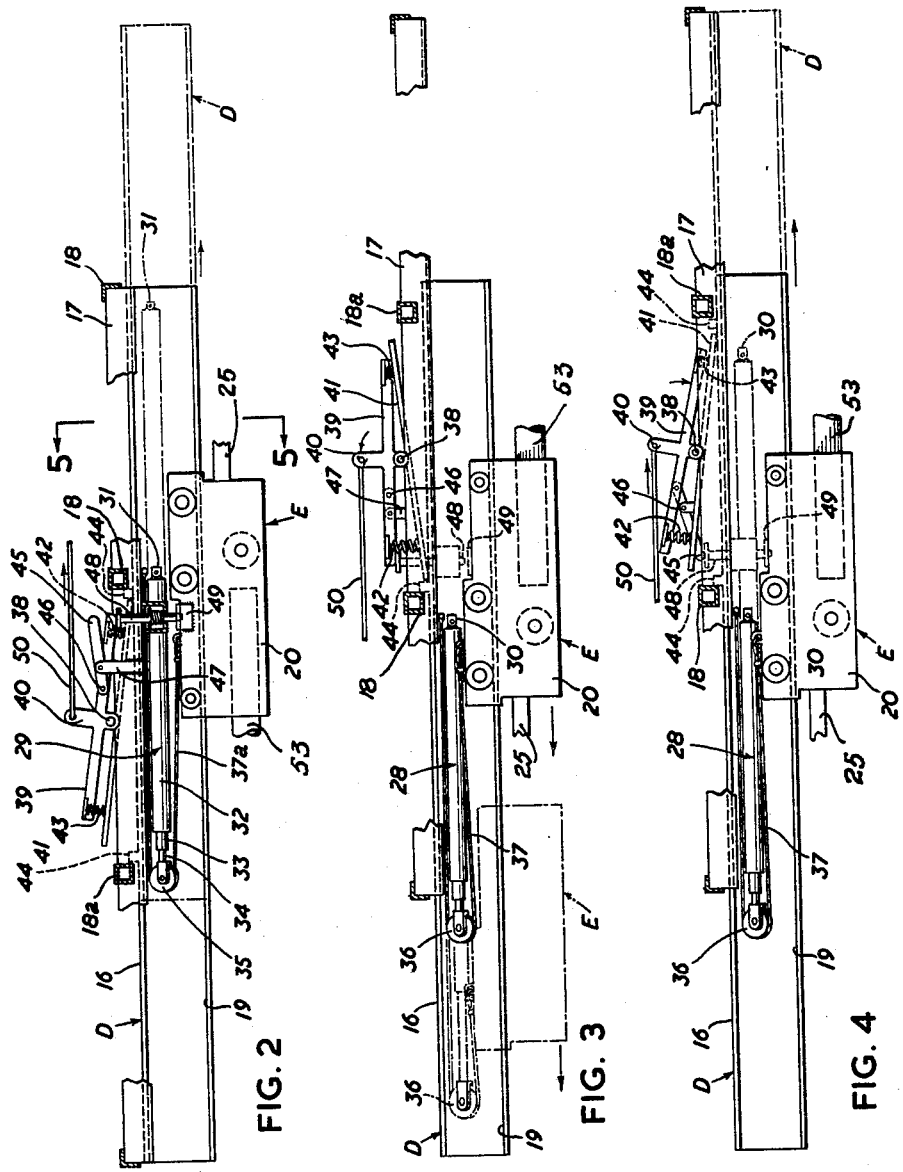

United States Patent Office 3,112,949
Patented Dec. 3, 1963

3,112,949
VEHICLE UNLOADING OR LOADING DEVICES
John C. Martin, Toronto, Ontario, Canada, assignor to Diesel Equipment Limited, Toronto, Ontario, Canada
Original application Dec. 29, 1958, Ser. No. 783,247, now Patent No. 3,006,485, dated Oct. 31, 1961. Divided and this application July 14, 1961, Ser. No. 124,067
1 Claim. (Cl. 294—63)

This invention relates to vehicle unloading and loading devices, and is a division of application Serial No. 783,247, filed December 29, 1958, now Patent No. 3,006,485.

The invention will be described generally in relation to the lifting and shifting of palletized loads from trucks and the like but is not confined thereto such that the invention may be applied to the unloading and/or loading of load units.

Palletized loads are often handled by fork lift trucks to lift and transport the load from one location to another, i.e. from a point of loading to a truck and which latter may be equipped with means for lowering loads at a point of delivery. Very often, in the transport of palletized brick or the like, a fork lift truck is not available at the point of delivery so that problems arise in moving the palletized loads from the truck at the point of delivery. It has previously been proposed to employ load lifting apparatus as part of truck equipment through which the palletized units may be lowered and in some cases lifted to the truck. This usually consists of complicated cage-like structures which move the loaded units to the rear of the truck, and through specially constructed apparatus forming part of the truck the palletized load is finally lowered at the delivery area.

The present invention relates to apparatus of a simplified type which may be combined with a truck and employed in a simple manner to lift and unload palletized and other load units from the truck in an efficient manner and which does not necessitate complicated unloading apparatus forming part of the truck construction and co-operating with the load lifting apparatus to unload said units. Conversely if desired, of course, the present invention may be employed also to load units on a truck which can be accomplished readily although its primary purpose is for unloading. Accordingly, the present invention avoids general disadvantages of the prior art in unloading devices and provides further advantages thereover.

The invention generally comprises vehicle unloading and loading devices in combination with a vehicle platform, a framework rising above the platform having load supporting means carried thereby, a carriage movably carried by said load supporting means, load lifting and lowering means suspended from said carriage, a means for moving said load supporting means to project beyond said framework, a means for locating said carriage in relation to a load to be lifted and means for actuating said load lifting and lowering means to lift said load and transport it along the path of said load supporting means. The load lifting means accordingly can be positioned clear of the platform for either raising or lowering a load beyond the edge of the platform and is movable inwardly of the platform to raise a load therefrom or deposit a load thereon. Of particular importance is the fact that the load supporting means is projected laterally to one side of the truck platform and the framework may be moved longitudinally of the platform to locate the load lifting and lowering means in relation to load units positioned along the length of the platform and which latter means is movable on its supporting means laterally of the platform adjacent to load units disposed across the width of the platform.

The load lifting and lowering unit is of a particularly simple form and one in which parts may be dismantled in a simple manner as to disengage the load lifting means from the load with facility.

The invention will be clearly understood by reference to the following detailed specification taken in conjunction with the accompanying drawings.

In the drawings:

FIG. 2 is a detailed view of the moving load carrying element in conjunction with the shifting carriage associated therewith and mechanism controlling relative movement between the two and shown in the relation for shifting the load supporting element from retracted to extended (dotted-line) position.

FIG. 3 is a similar view to FIG. 2 but looking at the reverse side of the load carrying element and showing the load carrying element in projected position and the arrangement of parts, providing for the shifting of the carriage on said supporting element to unloading or loading position.

FIG. 4 is a similar view to FIG. 3 showing the load carrying element in extended position and arranged for the return of the loading supporting element to retracted (dotted-line) position.

FIG. 5 is a sectional view taken substantially along the line 5—5 of FIG. 2.

FIG. 6 is a fragmentary side elevation of an alternative form of arranging and operating the load supporting element and carriage.

FIG. 9 is a fragmentary view of a preferred form of lifting fork employed in the loading and unloading device.

Figure 1:
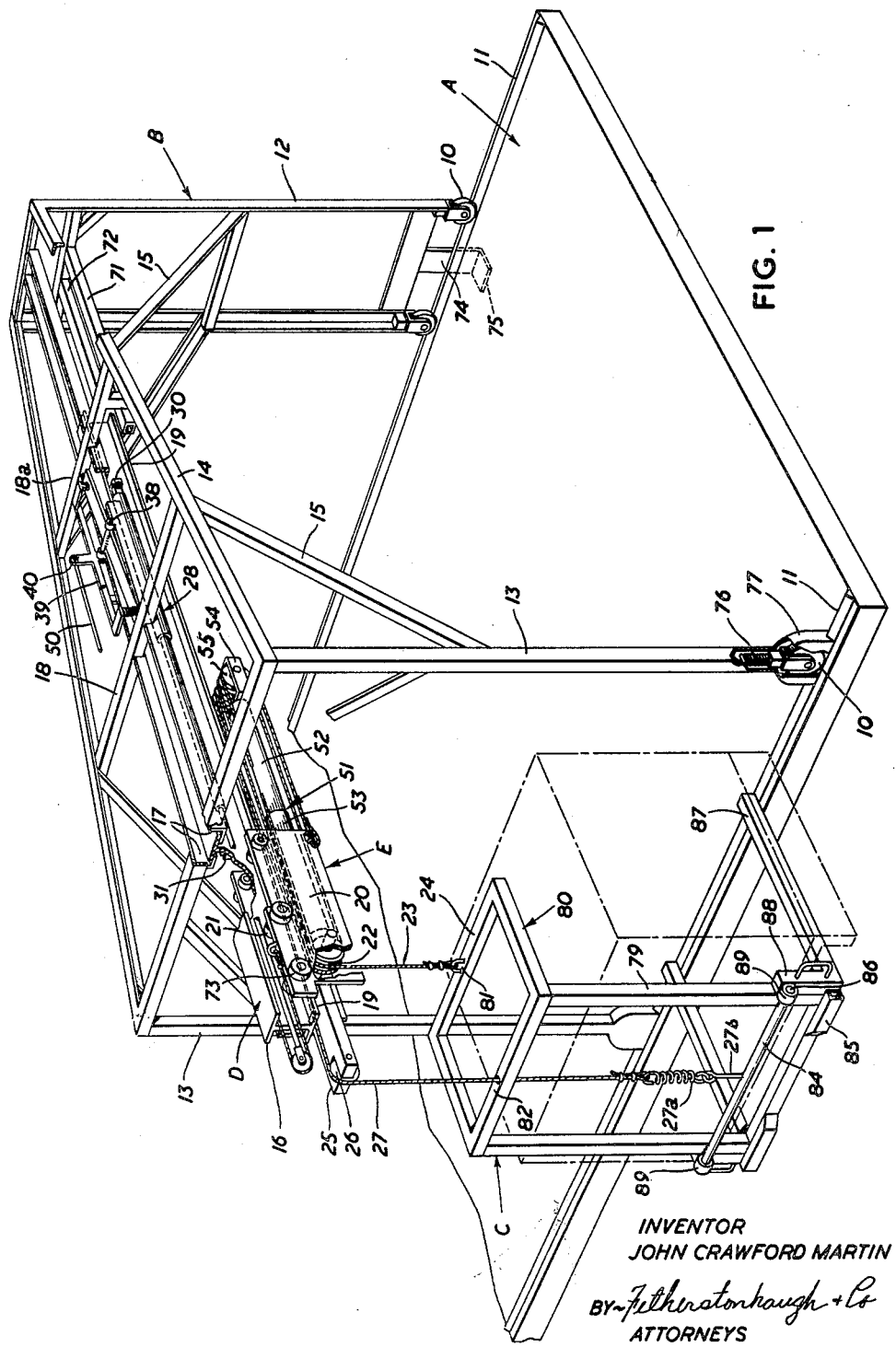
FIG. 1 is a schematic perspective view of a loading and unloading device according to the present invention shown associated with a truck platform and showing a movable load carrying support preferably in the form of a beam projected from the loading and unloading superstructure to one side of the truck platform.

Referring to the drawings, and first of all to FIG. 1, A indicates a suitable truck platform. B indicates a load lifting, loading and unloading frame associated with the platfrom and movable longitudinally thereon, preferably by means of grooved wheels 10 running on a pair of parallel tracks 11, one disposed at each side of the truck platform. A suitable lifting fork unit C is illustrated in conjunction with the frame B and which will be described in more detail hereinafter.

Frame B may take any suitable form, here shown as one made up generally of an angle iron framework having pairs of supporting legs 12 and 13 respectively, including suitable bracing and connecting structure as to form end supports and which are connected in any suitable rigid manner by a suitable top frame 14 braced in any suitable manner and which may include, as here shown, the inclined brace elements 15. The main requirement is that a sturdy frame is provided and wherein, on the unloading side thereof, the end framework is such that the standards 13 are sufficiently widely spaced as to permit passage of load units during unloading and/or loading.

Slidably supported on the upper part of the frame is a load supporting element D, here shown as an I-beam. This is slidably supported and, in the present showing, by means of its top flanges 16 which lap with the parallel spaced apart guides 17 which may take the form of angle irons carried from the transverse frame elements 18 and 18a of the top frame 14 and which guides extend longitudinally of the top frame over a substantial distance of the length of the latter, such that the supporting beam will be slidably supported or in effect suspended therefrom and which beam may be moved longitudinally of the frame to project laterally beyond the side of the truck platform A. This provides a projecting suspension beam from which the lifting fork unit C may be raised and lowered clear of the truck platform.

Slidably carried on the lower flanges 19 of the load supporting element D is a carriage E which is made up of a suitable framework, preferably including side plates 20 having a series of inwardly projecting rollers 21 which lap the upper surface of the lower flanges 19 of element D so that the carriage E is suspended from the load supporting element D and may travel longitudinally thereon when actuated as required. The carriage includes a pulley structure 22 supported on a transverse shaft between the plate elements 20 of the carriage and located at its forward end from which the lifting and lowering cable 23 extends to connect with the top frame 24 of the fork unit C. This carriage also includes the supporting arm 25 carrying a suitable pulley 26 from which a suitable balancing cable 27 is suspended to connect with the lifting fork unit, hereinafter referred to in more detail. Suffice it to say at this point that the carriage E and its associated parts are designed to function in the transport of the fork unit from a desired point within the side boundaries of the truck platform A to a position outwardly of the truck platform and to cause it to raise and lower as required whereby a load may be moved from the truck platform and lowered to the ground or other supporting area designed to receive the load when the load supporting element D is projected beyond the side of the truck platform.

In normal position, the supporting beam D is retracted inboard of the truck platform and carries on each side thereof a pair of fluid operated rams, one ram being indicated at 28 in FIGS. 1, 3 and 4 and the other ram being indicated by the numeral 29 as shown in the reversed view of FIG. 2, it being obvious, of course, that the rams 28 and 29 are reversed in direction to one another and each is anchored to the load supporting element or beam D as at 30 in the case of the ram 28 and 31 in the case of the ram 29. These rams are designed to be fluid operated (here shown as hydraulic rams), and include the main cylinder 32 in each case with a telescoping tubular piston rod 33 telescopically receiving the auxiliary piston rod 34 and each mount on the end of the piston rod 34 a pulley 35, in the case of ram 28, and 36 in the case of ram 29. A cable 37 in the case of ram 28, and 37a in the case of ram 29, is anchored at one end to the carriage E as shown and after passing over the pulley 35 in the case of cable 37, and pulley 36 in the case of cable 37a, the opposite end of these cables is anchored to the load supporting element or movable beam D. Therefore, assuming that the load supporting element D is in normal position inboard of the frame and that the carriage E is locked to the supporting frame B, it will be obvious that if ram 28 is operated as to extend its piston rods from the cylinder 32, the movement of these rods transfers through the pulley 35 and cable 37 the force of this movement so that the cable will necessarily cause the load supporting element or movable beam D to move outwardly from its inboard position to an outboard position projecting laterally beyond the side of the truck platform A and all the while the carriage E will remain stationary. It should be noted in this instance that the rams 28 and 29 in the normal position when the load supporting element or beam D is inboard of the supporting frame are disposed as illustrated in the diagrammatic view of FIG. 7, i.e. each, half retracted, so that when the beam D is projected outboard of the frame the ram 29 is extended as shown in dotted lines in FIG. 2 whereas the ram 28 is fully contracted as shown in the reverse view in FIG. 3.

When the beam or load supporting element D is extended as illustrated in FIG. 3, it is locked in this position and the lock between the frame and the carriage E is released so that by then operating the ram 28 the carriage E may be caused to travel along the beam to the outboard end of the beam. By reversing the operations, the carriage may be retracted and moved to a desired loading position as will be described in detailed operation hereinafter. However, at this point it would seem desirable to explain the manner in which the locks are effected as to produce the various differing operations required.

Mounted on the top frame 14, as clearly shown in FIG. 1, on the pivot shaft 38, is a rocking lever 39 pivoted intermediate its extent. This lever, as more clearly shown in FIG. 3, co-operates with the pivotally mounted stop bar 41 and is coupled therewith by means of the coil springs 42 and 43 respectively, the coil spring 42 being stronger than the coil spring 43. The stop bar 41 is positioned to one side of the lever 39 (FIG. 5) as to dispose this bar directly over the load supporting element or beam D and which latter carries a suitable stop 44 designed to be engaged by an end of the stop bar in the course of operation. On the opposite side of lever 42, the lock actuating finger 45 is pivotally mounted from its inner end as at 46 and pivotally fulcrumed intermediate its length from a fulcrum mounting 47 carried on the upper frame 14 in such a manner that the outer free end of the finger 45 is disposed over the head of the locking pin 48 which is spring mounted, on a cross bar of the frame 14, and normally urged upwardly. The head of the pin 48 is also disposed in the path of one end of the rocking lever 39 (FIG. 5). The carriage E is provided with means to co-operate with the locking pin, here shown as an orificed lug 49, so that when this lug is brought in registry with the locking pin and the latter depressed into a suitable orifice thereof, the carriage E is locked rigidly with the frame.

In the inboard position of the beam D, as shown in FIG. 2, the stop member 44 is disposed to butt transverse member 18a of the upper frame 14 and by operation of the actuating rod 50 in the direction of the arrow, the lever 39 is caused to depress the stop pin 48, against the pressure of its spring, to locate the end of this pin in the orifice of the lug 49 thereby to lock the carriage E in the position shown. Consequently, by operation of the ram 29 the beam D may be projected to the outboard position shown in dotted lines in FIG. 2. In this position, as shown in the reverse view of FIG. 3, the stop member 44 will engage the cross member 18 of the top frame 14 to limit the extent of the beam's outward travel. Then by operating the rod 50 in the opposite direction, the lever 39 is caused to swing on its pivot 38 as to locate one end thereof against the stop member 44 thereby locking the beam D in its outboard position. Simultaneously with this action, the other end of lever 39 is raised to disengage the locking pin 48 which then under pressure of its coil spring moves upwardly to disengage from the orifice of the lug 49 in the carriage E. Accordingly, if then the ram 28 is operated, it will be obvious that it will cause the carriage E (now unlocked from frame) to travel along the beam D to locate it on the outwardly projected portion thereof and clear of the side of the truck platform A, and simultaneously of course the ram 29 on the opposite side of the beam will be cause to contract. Then in this position, if it is desired to move the carriage back along the beam, it is only necessary to reverse operation causing ram 29 to expand to the desired extent which would then move the carriage back inwardly along the beam and to a selected position within the width of the truck platform according to the extent that ram 29 was caused to expand. Finally, upon locating the carriage E in a position to obtain registry between the locking pin 48 and the lug 49, the operating rod 50, when caused to move in the direction of the arrow shown in FIG. 4, will dispose the locking bar 39 in oppositely tilted position and will cause the locking finger 45 to swing to the position shown where it engages and depresses the locking pin 48, thus again to lock the carriage E to the top framework 14. Accordingly, to retract the beam D, it is only necessary to operate the ram 28 which upon expanding will cause the beam D to move from the position shown in FIG. 4 to the dotted line position, i.e. its inboard position. In the course of this operation, the stop 44 moving from its engagement with cross bar 18 of upper frame 14 will move to a position engaging the cross bar 18a, during the course of which travel it will engage the lower projected end of the bar 48 and slip past it, in which case the then depressed end of the bar 48 is in the path of the lug 44 as to retain the beam inboard.

Figure 8:
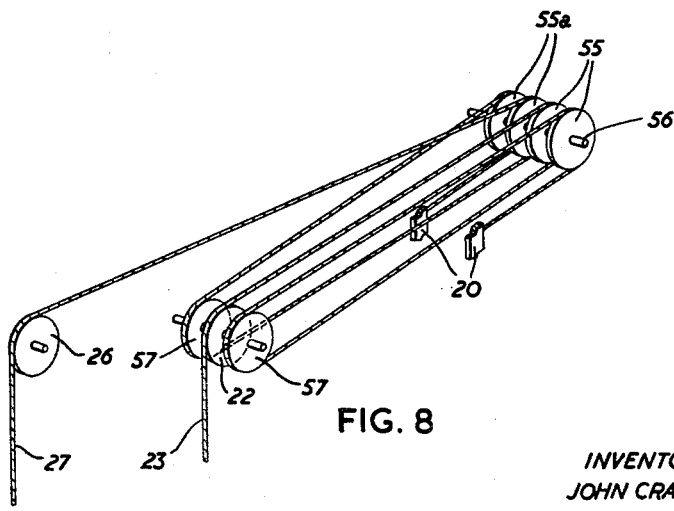
FIG. 8 is a schematic view of the cable and pulley arrangement which may be employed to effect operation of the movable parts responsive to the fluid actuated power supplying means.

The carriage E is provided with a fluid operated ram 51 having the piston 52 operating in the cylinder 53 which is mounted within the side plate framework of carriage E. At the end of the cylinder the pulley 22 is mounted over which cable 23 extends to connect with the lifting fork unit 24. At the free end of the piston 52, by suitable bracket means 54, a series of pulleys 55 and 55a (FIGS. 1 and 8) are mounted on the transverse shaft 56. Pulleys 57 are mounted on each side of the pulley 22 at the opposite end of the ram (see FIG. 8). The cable 23 passes from its connection with the fork unit 24 over pulley 22 and extends around one of the pulleys 55 and then over the opposed pulley 57, and then over the second pulley 55 with its opposite end anchored suitably to the carriage E as, for instance, to a side plate 20. The cable 27 has its outer end anchored to the fork unit C, as shown in FIG. 1, through the coil spring 27a to an anchor member 27b and passes up from the fork unit over pulley 26, carried on supporting arm 25 secured to carriage E, and then passes around one of the pulleys 55a and over one of the pulleys 57, as shown in FIG. 8, and then over the second pulley 55a and has its opposite end anchored to the carriage E as to one of the side plates 20. The cable 27 acts as a steadying and balancing cable for the fork unit C while the cable 23 acts as the raising and lowering cable for the unit. Consequently, it will be apparent that when the ram 51 is actuated the fork unit C can be raised and lowered and so manipulated as to perform its load lifting functions.

Figure 7:
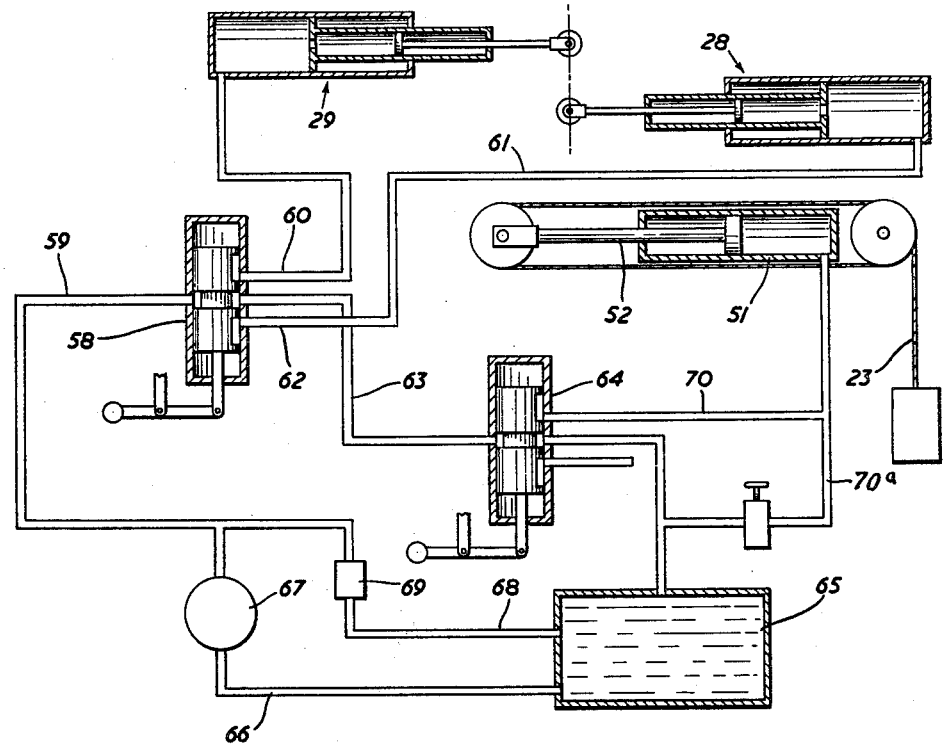
FIG. 7 is a schematic sectional view of the fluid power system for moving the load supporting element and/or carriage, as the case may be, which in the present instance is shown as a hydraulic unit.

Referring now to the diagrammatic illustration of the fluid operating system shown in FIG. 7, the operation of the apparatus will be described in detail. Assuming that the beam D is in its retracted inboard position within the framework and locked in that position by the bar 48, and that the carriage E is locked to the frame, as shown in FIG. 2, it will then be understood that the rams 28 and 29 are in the position diagrammatically illustrated in FIG. 7 with their pistons at an intermediate point. The actuating rod 50 is then operated in the opposite direction to the arrow of FIG. 2 which has the result of swinging the bar 48 to a reversed position, thus unlocking the beam by disengaging stop 44. Consequently, by operating the control valve 58 (FIG. 7) to connect the feed line 59 to the port 60, the fluid fed to ram 29 will cause its piston structure to move outwardly and impose a force, by means of its pulley 35, on the cable 27a (FIG. 2) and, by reason of the fact that the carriage E is locked to the top framework 14 and one end of cable 37a is anchored to the carriage, it follows that the beam D will be caused to move, from the position of FIG. 2 to the dotted line position, to project this beam outboard of the framework and laterally of the truck platform A. In this instance, the piston structure of the ram 28 will contract and fluid will exhaust from the end of the cylinder through the pipe line 61, through port 62, and via pipe line 63, through valve 64 to tank 65. At this point it will be noted that from the tank 65, line 66 passes by way of the pump 67 to the feed line 59, whereas pump by-passing line 68 incorporates a pressure relief valve 69.

As the beam assumes its outboard position, the stop member 44 will pass under the bar 41 and such bar in combination with the stop will, therefore, lock the beam in outboard position, as shown in FIGS. 3 and 4, but with the carriage E locked to the upper framework 14. Then to release the carriage E, the lever 39 is actuated to the position of FIG. 3 as to release pin 48. In this position, the control valve 58 is operated to place the feed line 59 in communication with the line 61 as to supply fluid under pressure to the ram 28, the pistons of which at that point are retracted. Under pressure, the pistons of ram 28 are caused to move and apply force against the cable 37 and by reason of the fact that one end thereof is anchored to beam D and the other to unlocked carriage E, the carriage is moved along beam D to a point desired. Let us assume that there is a unit load to be lifted such as a pallet of bricks disposed on the left-hand side of the truck platform A, the carriage is caused to move on the beam D until the forks of the lifting unit C are clear of the unit load, i.e. the carriage is moved to the dotted line position shown in FIG. 3. Then, by operating control valve 64 to vent line 70 from the cylinder of ram 51 via by-pass line 70a, the fork lift unit C under its own weight will be lowered to the appropriate point as to dispose its forks below the pallet. Valve 58 is then operated as to cause ram 29 to operate, by placing feed line 59 in communication with port 60 so that the carriage E is moved from the dotted line position in FIG. 3 to the necessary position towards the right of FIG. 3 until the forks of the fork lift unit are disposed under the pallet. Valve 64 is then operated to place feed line 63 is communication with line 70 as to actuate the ram 51 and as its piston rod 52 is projected from the cylinder, the cable 23 is raised and cable 27 is likewise raised. When the pallet is raised from the floor of the truck as to clear it, then control valve 58 is again operated as to cause fluid to pass through to ram 28 and to move the carriage E to the dotted line position shown in FIG. 3, thus carrying the fork lift unit with its load to a position clear of the truck platform. Consequently, upon operation of the control valve 64 to vent ram 51, the load will be lowered to a desired level as to the ground or other support, thus to deposit the loaded pallet. It is obvious, of course, that with disengagement of the fork unit C from the discharged load, the fork unit is raised in a similar manner previously described and by way of the carriage may be moved along the beam D inwardly over the truck platform to pick up another loaded pallet or other load unit disposed in the middle of or on the right-hand side of the truck platform A. In this instance, however, since the beam D is in its outboard position, it is necessary to provide for support of the carriage at the opposite end of the framework beyond the inner end of beam D. In this instance, a pair of tracks 71 and 72 are carried on the upper framework disposed on each side of the beam D and at a level so that the upper level of the track will be flush with the upper surface of the lower flanges 19 of beam D and in the outboard position of the beam the inner ends of the tracks 71 and 72 will lap the inner end of beam D (FIG. 1). The tracks 71 and 72 may be continued if desired completely through the framework as to parallel the beam throughout the extent of the framework should this be desired for strength-giving or other purposes. Regardless of this, these tracks provide support for the carriage E when it is moved over to the inner end of the supporting frame when the beam D is in outboard position. In this instance, the side plates of carriage E carry a plurality of rollers 73 disposed on the outside of the carriage and at a corresponding level to the rollers 21 on the inside of these plates (FIGS. 1 and 5). Therefore, as the carriage is moved over to the right-hand side of the truck platform A, the rollers 73 will engage and ride upon the tracks 71 and 72, thus supporting the carriage when it is necessary to have the lifting fork structure on that side of the truck platform. Thus, the lifting fork unit may be lowered and moved to engage the load at that side of the truck, raised and moved out to the outboard end of the beam D, and its load deposited in the manner which has previously been described.

As has been indicated, the framework B is movable longitudinally of the truck platform by means of the rollers 10 along the tracks 11. Consequently, load units positioned in other areas of the truck are removed by sliding this frame to the desired position as to locate the lifting fork in the line with the load units. In this instance, it should be noted that the framework is, of course, suitably supported against the weight of the load when poised on the beam D in its outboard position and which may take the form of a slidable anchoring element 74 which is provided with the foot 75 extending under the truck platform A to provide for such anchor. It should be noted also that one pair of the rollers 10 at least is given a spring mounting 76 and such rollers are encased within a housing shoe 77 rigidly connected with the standards 13. Consequently, when the carriage E is under load, the shoes 77 will be forced down frictionally to engage the track 11, thus to hold the framework B rigidly against shifting movement on the tracks 11.

The lifting fork generally comprises an upright framework 79 and a top, substantially horizontal framework 80 having the forward cross bar 81 and rearward cross bar 82. The lifting cable 23 is anchored to the centre of the forward cross bar 81 of the top framework 80, whereas the cable 27 passes through or is otherwise in guided connection with the rearward cross bar 82 of the top framework and extends down to unite with a suitable coil spring 27a which in turn is anchored at 27b to the cross bar 84 of the vertical frame 79, which cross bar is disposed adjacent the bottom of the latter framework. Also on the frame 79 are the support lugs 85 for the lifting forks and which are secured to the bottom of frame 89 and are designed to project laterally therefrom as shown. The bar 84 is preferably of tubular construction and is designed to provide projecting arms 86 on each side of the frame 79 disposed above the lugs 85 and in spaced relation thereto. The tines or lifting arms 87 of the lifting fork unit are detachable from the unit and are formed with the right angular extensions 88 to the rear thereof which carry the tubular sockets 89. These sockets are designed, as shown, to receive the projecting ends 86 of the bar 84 to mount the tines or arms 87 of the fork unit while the lugs 85 bear against the rear surface of the extensions 88 as rigidly to mount them for lifting action. As shown in FIG. 9, the extensions 86a of the tubular rod 84 preferably take the form of telescopic elements which telescope within the bar 84. Therefore, by retracting these ends 86a inwardly, disengagement from the sockets 89 is readily achieved so that the tines or arms 87 may be removed from below a pallet or the like without any other action being necessary such as their lateral displacement necessary in the form of FIG. 1. Preferably spring means is included such as the coil spring 90 disposed between the telescopic extensions 86a and, the bar 84 is slotted, as to permit of connection to these extensions to cause them to move. One manner of doing this is to provide the toggle link construction 91 with suitable projecting pins so that if desired, both extensions may be telescoped into the tube 84 in a single operation.

The lifting force for the lifting fork unit is applied through the cable 23 and cable 27 acts as a balancing cable to maintain the fork in a stable position.

Of course the top frame 80 might be varied in construction as long as there is an anchoring point for cable 23 disposed forwardly of the frame 79 and which, of course, itself could be modified in shape as to dispose the uprights thereof at an inwardly and upwardly inclining angle as to meet a frame or member of narrower width than the top frame 82.

As an alternative to the manner of operating the carriage E and supporting beam D, reference is made to FIG. 6. In this case the ram 28 is shown as anchored to the cross bar 18 of the frame as at 92 instead of being connected to the beam D as previously described. The ram 29 (not shown in FIG. 6) is, of course, anchored to the frame in a similar manner. Moreover, instead of locking the carriage E to the frame as previously described, I provide the locking pin 93 disposed at the outward end of beam D and adapted for locking engagement with the lug 94 projecting forwardly from the free end of carriage E. Locking and unlocking of the pin 93 with the lug 94 may be accomplished by means of a flexible Bowden cable 95 whereas the pivoted locking bar 96 may be conveniently operated by Bowden cable 97 to swing between its two positions as to lock the beam D in its inboard or outboard positions in conjunction with the stop 44. In result, therefore, by locking the carriage E to the beam D and upon operating ram 28, the beam is projected from its inboard to its outboard position when the locking bar 96 is swung to unlock it. Then by disengaging the carriage from the beam D through operation of the pin 93, the carriage may be actuated along beam D by means of the ram 29 (which is disposed on the other side of the beam but not shown in FIG. 6) just the same as in the other arrangement first described.

It is apparent from the foregoing that the apparatus described will function in a simple manner in the loading and unloading of load units from a vehicle and which, by reason of its comparative simplicity with prior proposals, may be manufactured at a lower cost and which will function more efficiently. By providing an arrangement whereby a beam may be projected laterally of the platform of the vehicle as distinguished from apparatus disposed on the end of the vehicle for unloading purposes, a much more efficient and versatile operation is achieved. It will, of course, be appreciated that an arrangement could be provided for projecting a beam beyond the end of the vehicle platform if this were desired.

It will be understood that modification may be made in the structure without departing from the spirit of the invention.

What I claim as my invention is:

In vehicle unloading and loading devices including load lifting and lowering means, a fork lift unit including a normally vertically disposed frame, a transverse bar spaced above the base thereof, a plurality of detachable lifting elements of substantially L-shaped construction having a long arm adapted to be disposed normal to the frame and a short arm rising therefrom, means adjacent the free end of said short arm of said elements for detachable connection with said transverse bar of the frame as to locate the adjacent ends of said long arms in butting relationship with said frame whereby to secure said elements on said frame rigidly projecting therefrom at right angles thereto, wherein said transverse bar is tubular, having telescopic extensions therein projecting from the ends thereof, said short arms having socket means for engaging said extensions to mount said arms on said unit, said extensions being axially retractable in said tubular bar to disengage said arms from connection therewith.

References Cited in the file of this patent

UNITED STATES PATENTS

| | | |
|---|---|---|
| 2,581,364 | Cushman | Jan. 8, 1952 |
| 2,582,663 | Weiss | Jan. 15, 1952 |
| 2,596,747 | Ward et al. | May 13, 1952 |
| 2,668,602 | Cushman | Feb. 9, 1954 |
| 2,772,795 | Cramer et al. | June 25, 1957 |
| 2,809,759 | Manker | Oct. 15, 1957 |
| 2,847,138 | Backofen et al. | Aug. 12, 1958 |